(12) United States Patent
Oyanagi et al.

(10) Patent No.: US 11,057,105 B2
(45) Date of Patent: Jul. 6, 2021

(54) MONITORING DEVICE AND MONITORING METHOD

(71) Applicant: Nippon Telegraph and Telephone Corporation, Tokyo (JP)

(72) Inventors: Hiroyuki Oyanagi, Tokyo (JP); Osamu Okino, Tokyo (JP); Yuichiro Ishizuka, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 16/966,115

(22) PCT Filed: Feb. 14, 2019

(86) PCT No.: PCT/JP2019/005224
§ 371 (c)(1),
(2) Date: Jul. 30, 2020

(87) PCT Pub. No.: WO2019/160002
PCT Pub. Date: Aug. 22, 2019

(65) Prior Publication Data
US 2021/0075505 A1 Mar. 11, 2021

(30) Foreign Application Priority Data
Feb. 14, 2018 (JP) .............................. JP2018-023716

(51) Int. Cl.
*H04B 10/07* (2013.01)
*H04L 12/24* (2006.01)

(52) U.S. Cl.
CPC ......... *H04B 10/07* (2013.01); *H04L 41/0631* (2013.01)

(58) Field of Classification Search
CPC ...... H04B 10/07; H04L 41/0631; H04L 12/24
(Continued)

(56) References Cited

U.S. PATENT DOCUMENTS

| 2011/0058806 A1* | 3/2011 | Sabet ................ H04L 41/0631 398/1 |
| 2015/0281453 A1* | 10/2015 | Maturana ........... G05B 23/0213 379/265.12 |
| 2019/0361759 A1* | 11/2019 | Haugen ................ G06F 11/079 |

OTHER PUBLICATIONS

Ishizuka et al., "Proposal of Alarm Collation Scheme in Multi-Vendor Optical Path Configuration by OpS," Society Conference of the Institute of Electronics, Information and Communication Engineers, Sep. 12, 2017, 4 pages (with English Translation).

* cited by examiner

*Primary Examiner* — Mohammad R Sedighian
(74) *Attorney, Agent, or Firm* — Fish & Richardson P.C.

(57) ABSTRACT

A monitoring device 1 includes an individual alarm reception unit 10 configured to receive individual alarms issued from a plurality of devices constituting an optical transmission network, a table 20 in which a search operator for searching for necessary information, that is information required for treating the individual alarms in the same manner when specifications of the individual alarms are different from each other, is associated with information included in the individual alarms, a search operator extraction unit 30 configured to extract the search operator using the information included in each of the individual alarms as a key, a rule 40 in which the search operator is associated with the necessary information; and a unified alarm information generation unit 50 configured to search the rule 40 using the search operator as a key, compare the information included in the individual alarms with the necessary information corresponding to the search operator, and add information, that is included in the necessary information but not included in the individual alarm, to the individual alarm to generate unified alarm information.

6 Claims, 9 Drawing Sheets

(58) Field of Classification Search
USPC .......................................................... 398/17
See application file for complete search history.

| INFORMATION INCLUDED IN INDIVIDUAL ALARM | VENDOR A | VENDOR B | VENDOR C | ... |
|---|---|---|---|---|
| TIME OF OCCURRENCE | ◎ | ◎ | ◎ | ... |
| ALARM OID | ◎ | ◎ | ◎ | ... |
| ALARM TYPE | | ◎ | | ... |
| ALARM DESCRIPTION | | ◎ | | ... |
| ALIAS | ○ | | | ... |
| POSITION INFORMATION | ○ | | | ... |
| DIRECTION (INPUT/OUTPUT) | | | | ... |
| SERVICE IMPACT | ○ | | ○ | ... |
| ALARM SEVERITY | ○ | | | ... |
| ⋮ | ⋮ | ⋮ | ⋮ | |

Fig. 4

| SEARCH OPERATOR | DEVICE NAME/ALARM NAME | | | ... |
|---|---|---|---|---|
| 0001 | A_01/AAA | B_02/AAB | C_03/AAC | ... |
| 0002 | A_02/AA1 | B_02/BB1 | C_03/CC1 | ... |
| 0003 | A_03/AA2 | B_03/BB2 | C_03/CC2 | ... |
| ⋮ | ⋮ | ⋮ | ⋮ | |

Fig. 5

| SEARCH OPERATOR | NECESSARY INFORMATION INDEX/VALUE | | | ... |
|---|---|---|---|---|
| 0001 | ALARM NAME/ACC | SEVERITY/major | SERVICE IMPACT/SA | ... |
| 0002 | SEVERITY/major | SERVICE IMPACT/SA | – | ... |
| ⋮ | ⋮ | ⋮ | ⋮ | |

Fig. 6

| SEARCH OPERATOR | DEVICE NAME/ALARM NAME | | | CONDITION |
|---|---|---|---|---|
| 0001 | A_01/AAA | B_02/AAB | C_03/AAC | |
| 0002 | A_02/AA1 | B_02/BB1 | C_03/CC1 | |
| 0003 | A_03/AA2 | B_03/BB2 | C_03/CC2 | |
| ... | ... | ... | ... | |
| 000A | A_01/AAB | B_02/ABB | C_03/ACB | |
| 000B | A_01/AAB | B_02/ABB | C_03/ACB | BACKUP ELEMENT FAILURE |
| ... | ... | ... | ... | |

MONITORING DEVICE AND MONITORING METHOD

CROSS-REFERENCE TO RELATED APPLICATIONS

This application is a National Stage application under 35 U.S.C. § 371 of International Application No. PCT/JP2019/005224, having an International Filing Date of Feb. 14, 2019, which claims priority to Japanese Application Serial No. 2018-023716, filed on Feb. 14, 2018. The disclosure of the prior application is considered part of the disclosure of this application, and is incorporated in its entirety into this application

TECHNICAL FIELD

The present invention relates to a monitoring device and a monitoring method for monitoring an optical transmission network.

BACKGROUND ART

In an optical transmission network, optical paths have been formed using devices of the same manufacturing company (hereinafter, referred to as a vendor) due to the difficulty of interconnection of optical paths. In recent years, however, a disaggregation type optical transmission network in which devices are divided according to functions and products of different vendors are combined has been constructed.

In the disaggregation type optical transmission network, a large number of alarms occur because the devices are divided according to the functions. A method of describing an alarm suppression condition in a general-purpose format and associating individual alarms with general-purpose information in order to suppress the occurrence of a large number of alarms is disclosed in, for example, Non-Patent Literature 1.

CITATION LIST

Non Patent Literature

Non-Patent Literature 1: "Proposed alarm correlation scheme in a multi-vendor optical path configuration using Ops," Yuichiro Ishizuka and three others, The Institute of Electronics, Information and Communication Engineers Society Conference; September, 2017.

SUMMARY OF THE INVENTION

Technical Problem

However, the technology of Non-Patent Literature 1, has a problem in that alarms cannot be correctly identified when desired information or attributes are not included in the individual alarms.

The present invention has been made in view of this problem, and an object of the present invention is to provide a monitoring device and a monitoring method for correctly identifying alarms even in an optical transmission network in which alarms with different specifications are present.

Means for Solving the Problem

A monitoring device according to an aspect of the present invention includes an individual alarm reception unit configured to receive individual alarms issued from a plurality of devices constituting an optical transmission network; a table in which a search operator for searching for necessary information, that is information required for treating the individual alarms in the same manner when specifications of the individual alarms are different from each other, is associated with information included in the individual alarms; a search operator extraction unit configured to extract the search operator using the information included in the individual alarms as a key; a rule in which the search operator is associated with the necessary information; and a unified alarm information generation unit configured to search the rule using the search operator as a key, compare the information included in the individual alarms with the necessary information described in the searched rule, and add information, that is included in the necessary information but not included in the individual alarm, to the individual alarm to generate unified alarm information.

An alarm method according to an aspect of the present invention is a monitoring method executed by a monitoring device for monitoring an optical transmission network, the monitoring method including: receiving individual alarms issued from a plurality of devices constituting the optical transmission network; searching, using the information included in each of the individual alarms as a key, a table in which a search operator for searching for necessary information, that is information required for treating the individual alarms in the same manner when specifications of the individual alarms are different from each other, is associated with information included in the individual alarms thereby extracting the search operator; searching, using the search operator as a key, a rule in which the search operator is associated with the necessary information; comparing the information included in the individual alarms with the necessary information described in the searched rule, and adding information, that is included in the necessary information but not included in the individual alarm, to the individual alarm to generate unified alarm information.

Effects of the Invention

According to the present invention, it is possible to correctly identify alarms.

BRIEF DESCRIPTION OF DRAWINGS

FIG. 4 is a diagram illustrating a portion of information included in an individual alarm when vendors of elements (devices) with the same functions may be different.

FIG. 5 is a diagram schematically illustrating an example of a table illustrated in FIG. 1.

FIG. 6 is a diagram schematically illustrating an example of a rule illustrated in FIG. 1.

FIG. 8 is a diagram schematically illustrating a modification example of the table.

DESCRIPTION OF EMBODIMENTS

Embodiments of the present invention will be described below with reference to the drawings. The same portions are denoted by the same reference signs in a plurality of drawings, and will not be further described.

Figure 1:
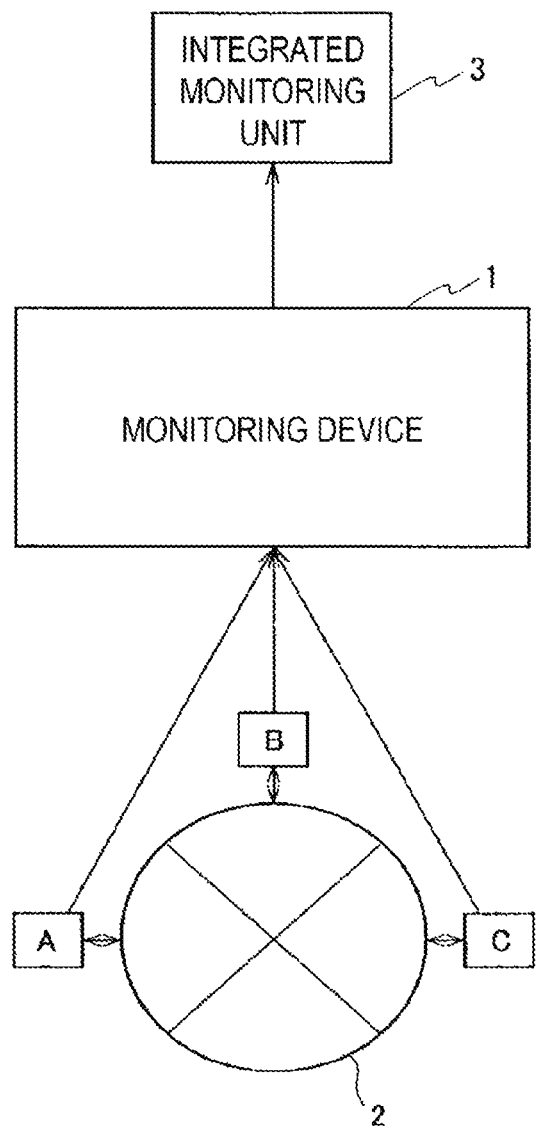
FIG. 1 is a diagram illustrating an example of a configuration in which an integrated monitoring system is configured using a monitoring device according to an embodiment of the present invention.

FIG. 1 is a diagram illustrating an example of a configuration in which an integrated monitoring system is configured using a monitoring device according to an embodiment of the present invention. An integrated monitoring system 100 illustrated in FIG. 1 includes a plurality of elements A, B, and C, an optical transmission network 2, a monitoring device 1, and an integrated monitoring unit 3.

The integrated monitoring system 100 illustrated in FIG. 1 monitors the optical transmission network 2 in which a plurality of elements A, B, and C are connected to each other. Each of the elements A, B, and C is, for example, a service provision server that provides services to an end-user terminal (not illustrated) connected to each element via a router which is not illustrated.

Further, when an anomaly of the optical transmission network 2 is detected, the respective elements A, B, and C issue individual alarms to the monitoring device 1. Specific examples of the individual alarms will be described below. Hereinafter, the elements A, B, and C are referred to as devices A, B, and C, respectively.

The monitoring device 1 converts the individual alarms received from each of the devices A, B, and C into unified alarm information that can be treated in the same manner (in a unified manner) and outputs the unified alarm information to the integrated monitoring unit 3. The integrated monitoring unit 3 notifies an administrator of the received unified alarm information, for example, by displaying the received unified alarm information.

First Embodiment

Figure 2:
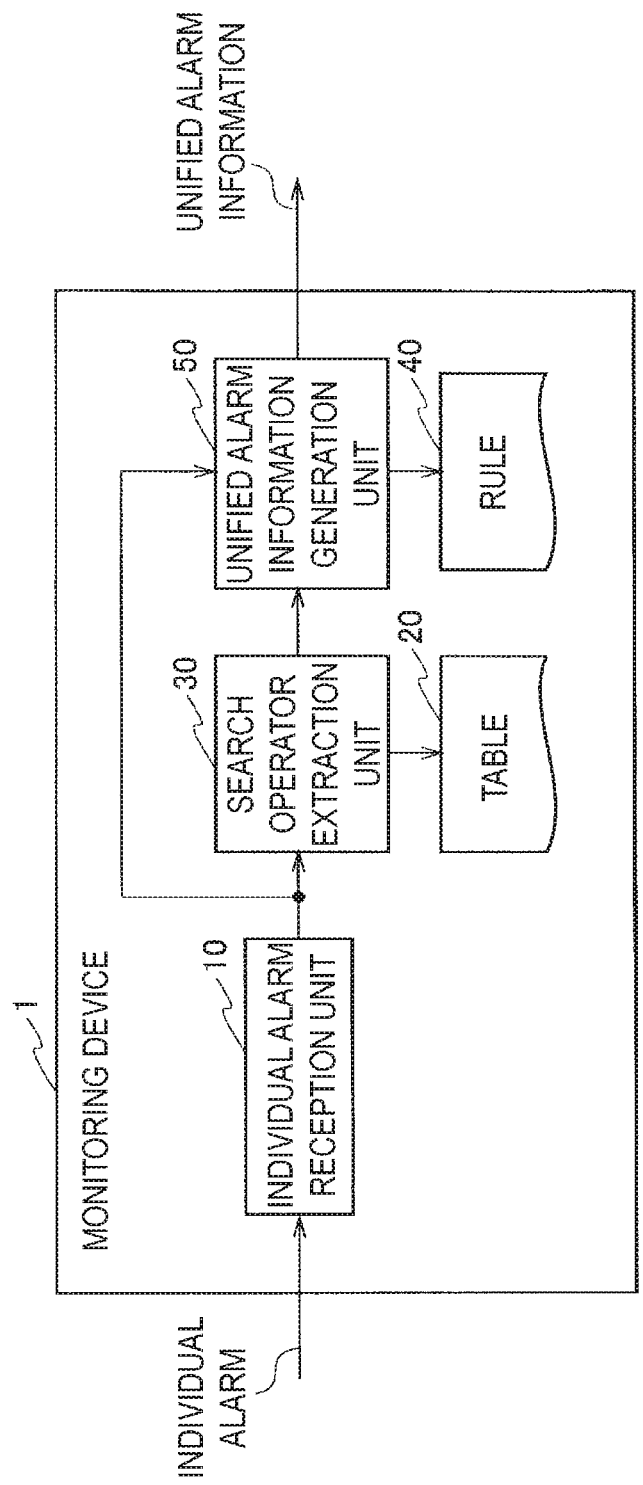
FIG. 2 is a block diagram illustrating an example of a functional configuration of the monitoring device according to a first embodiment of the present invention.

FIG. 2 is a block diagram illustrating an example of a functional configuration of the monitoring device 1 according to the first embodiment of the present invention. The monitoring device 1 includes an individual alarm reception unit 10, a table 20, a search operator extraction unit 30, a rule 40, and a unified alarm information generation unit 50.

Figure 3:
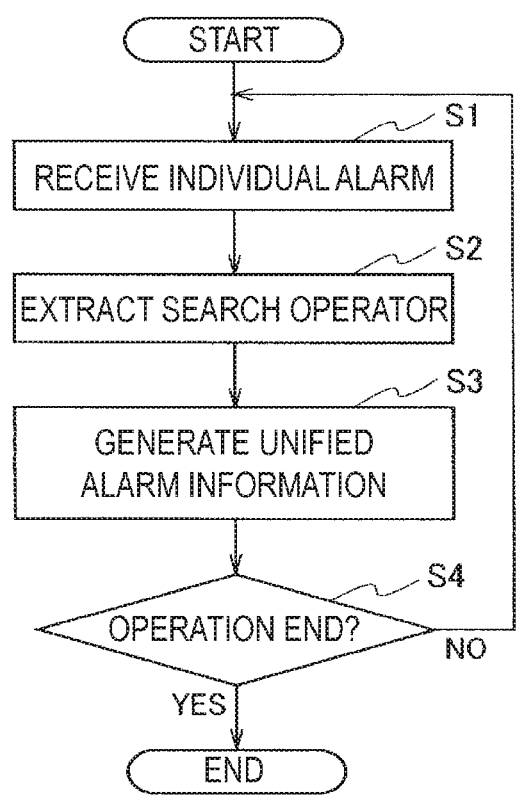
FIG. 3 is a flowchart illustrating a processing procedure of the monitoring device illustrated in FIG. 1.

FIG. 3 is a flowchart illustrating a processing procedure of a monitoring method that is executed by the monitoring device 1. A configuration and operation of the monitoring device 1 will be described with reference to FIG. 2 and FIG. 3.

The individual alarm reception unit 10 receives individual alarms issued from a plurality of devices A, B, and C constituting the optical transmission network 2 (step S1). The individual alarms vary when vendors that manufacture the respective devices A, B, and C are different from each other. Variations in individual alarms are noticeable in a disaggregation type optical transmission network in which devices are divided according to functions and products of different vendors are combined.

FIG. 4 is a diagram illustrating a portion of information included in a certain individual alarm when vendors of devices with the same functions are different. A first column in FIG. 4 shows the information included in the individual alarm. A second column shows content of individual failure information of a device of vendor A. A double circle (⊚) indicates information described in a standardized format (standard MIB). A circle (o) indicates information described in a format unique to each vendor (vendor MIB).

As illustrated in FIG. 4, a "service impact" and a "alarm severity" included in the individual alarms of vendor A are not included in the individual alarms of vendor B. Further, the "alarm severity" is not included in the individual alarms of vendor C.

The "service impact" is information of 1 bit (presence or absence) indicating whether a service is impacted. The "alarm severity" is information that represents a severity of a failure in four levels: critical, major, minor, and non-reported.

When this information is not included in an alarm, the integrated monitoring unit 3, which monitors the optical transmission network 2, cannot determine reaction to the individual alarms. Thus, the monitoring device 1 according to the first embodiment generates the unified alarm information in which information necessary for the integrated monitoring unit 3 to determine the reaction is added to the individual alarm.

In order to generate the unified alarm information, the monitoring device 1 first associates the individual alarms with a search operator using the table 20.

The table 20 is a table in which the search operator for searching for the necessary information, which is information necessary for treating the individual alarms in a unified manner, is associated with the information included in the individual alarms. Information necessary for treating individual information in the unified manner refers to information necessary for treating the individual alarms in the same manner when specifications of the individual alarms are different from each other.

FIG. 5 is a diagram schematically illustrating an example of the table 20. A first column in FIG. 5 shows the search operator, and a second column and subsequent columns are individual alarms associated with the search operator in the first column. The individual alarms illustrated in FIG. 5 are abstracted. The individual alarms of A_01/AAA, B_02/AAB, and C_03/AAC are associated with a search operator "0001." A portion before "/" indicates a device name, and a portion after "/" indicates an alarm name.

The search operator extraction unit 30 extracts the search operator using the information included in the individual alarms received by the individual alarm reception unit 10 as a key (step S2). The information included in the individual alarms is, for example, an alarm object identification (OID) included in all of the individual alarms.

For example, when an individual alarm C_03/AAC is issued from a terminal C, the search operator extraction unit 30 searches the table 20 using C_03/AAC as a key to extract the search operator "0001." The extracted search operator "0001" is output to the unified alarm information generation unit 50.

The unified alarm information generation unit 50 searches the rule 40 using the search operator extracted by the search operator extraction unit 30 as a key. The unified alarm information generation unit 50 compares the information included in the individual alarms received by the individual alarm reception unit 10 with the necessary information described in the rule that has been searched for, and adds information, which is included in the necessary information but not included in the individual alarm, to the individual alarm thereby generating the unified alarm information (step S3).

The rule 40 is a rule in which the necessary information necessary for the unified alarm information is associated with the search operator. FIG. 6 schematically illustrates an example of the rule 40. A first column in FIG. 6 shows the search operator, and a second column and subsequent columns show the necessary information necessary for the unified alarm information.

Figures 7A, 7B:
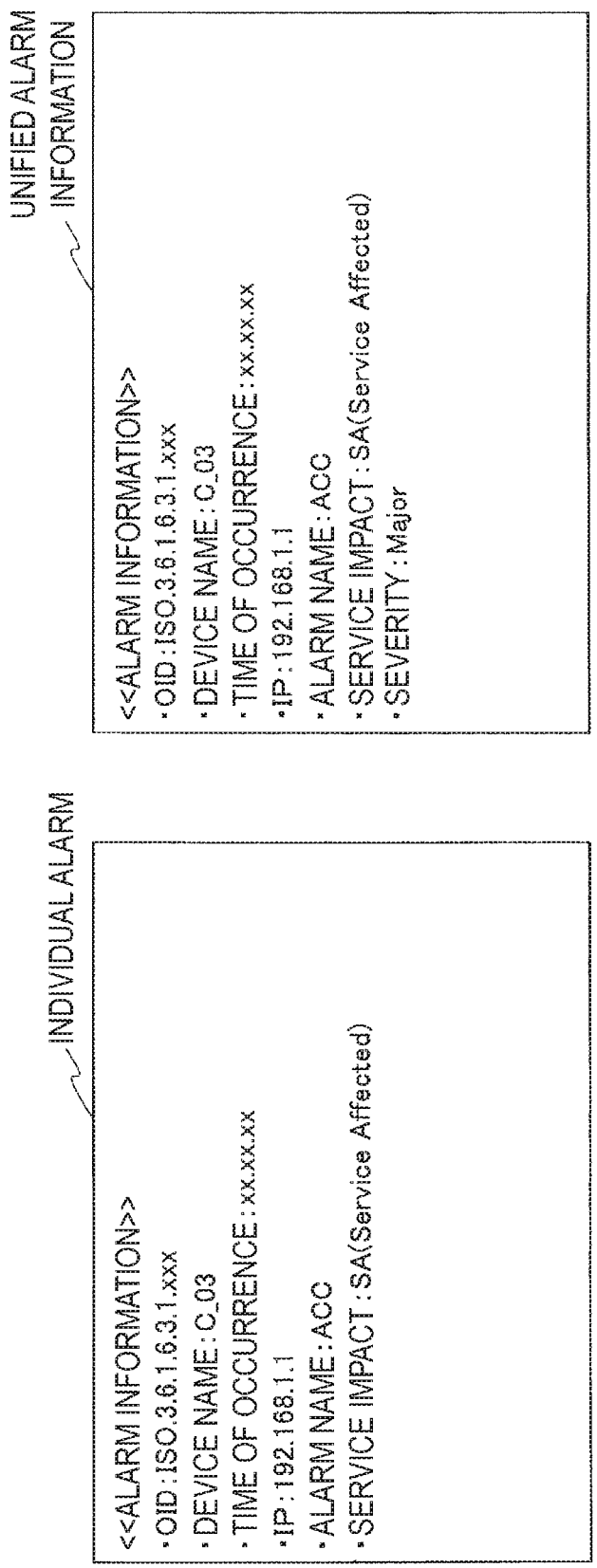
FIGS. 7A and 7B are diagrams illustrating an example of an individual alarm and unified alarm information.

FIGS. 7A and 7B illustrate an example of the individual alarm and the unified alarm information. FIG. 7A illustrates information included in the individual alarms "C_03/AAC." FIG. 7B illustrates information included in the unified alarm information corresponding to FIG. 7A.

For example, the individual alarm "C_03/AAC" corresponds to the search operator "0001" according to the table 20 (FIG. 5). On the other hand, the necessary information associated with the search operator "0001" in the rule 40 includes an alarm name, a severity, and a service impact.

In this example, information which is included in the necessary information associated with the search operator "0001" and not included in the individual alarm "C_03/AAC," is the severity. Thus, the unified alarm information generation unit 50 generates unified alarm information in which a "severity: Major" is added to the individual alarm "C_03/AAC" (FIG. 7B).

As a result, the integrated monitoring unit 3 that receives the unified alarm information can treat alarms issued from devices of different vendors as the same information, and can correctly identify the alarms.

The processing steps S1 to S3 described above are repeated until the monitoring device 1 stops operation (NO in step S4).

The monitoring device 1 according to the first embodiment includes: the individual alarm reception unit 10 configured to receive individual alarms issued from a plurality of devices constituting the optical transmission network 2; a table 20 in which a search operator for searching for necessary information, which is information necessary for treating the individual alarms in the unified manner, is associated with information included in the individual alarms; a search operator extraction unit 30 configured to extract the search operator using the information included in each of the individual alarms as a key; a rule 40 in which the search operator is associated with the necessary information; and a unified alarm information generation unit 50 configured to search the rule using the search operator as a key, compare the information included in the individual alarms with the necessary information corresponding to the searched rule, and add information, which is included in the necessary information but not included in the individual alarm, to the individual alarm to generate unified alarm information. As a result, even when the vendors of the devices constituting the optical transmission network 2 are different from each other, the alarms can be displayed as the same information by the integrated monitoring unit 3.

Further, with the above configuration of the monitoring device 1, because the necessary information is added autonomously to the individual alarms, it is possible to significantly reduce the processing in the integrated monitoring unit 3. The processing that can be reduced is processing of confirming content of the individual alarms.

Adding any necessary information required by the administrator to the necessary information included in the rules 40 is also possible. Thus, in a disaggregation type optical transmission network, the integrated monitoring system desired by the administrator can be configured later.

Modification Example

A condition may be added to the above described table 20. The condition is for changing content of unified alarm information of individual alarms with the same device names/alarm names.

FIG. 8 is a diagram schematically illustrating a table of the modification example to which a condition has been added. The table 22 illustrated in FIG. 8 is different from the table 20 illustrated in FIG. 5 in that a column for the condition is added to the table 20.

As illustrated in FIG. 8, the device names/alarm names of search operators "000A" and "000B" are the same. For example, when the device with a device name A_01 includes a backup device (a standby system), the action the administrator would like to take may be different between the case where an active system has failed and the case where the standby system has failed.

Thus, content of the rule 40 is changed by setting the table 22 to which a condition is added, as illustrated in FIG. 8. For example, the severity when an individual alarm A_01/AAB is issued from the active system is minor, whereas the severity when an individual alarm A_01/AAB is issued from the standby system can be changed to major or the like. That is, content of the necessary information included in the respective rules corresponding to the search operators "000A" and "000B" illustrated in FIG. 8 is changed.

The table 22 of the modification example includes a condition for extracting the search operator, and the search operator extraction unit 30 extracts the search operator when the condition included in the individual alarm matches the condition included in the table 22. Here, the condition included in the individual alarm is, for example, an IP address for identifying the device. The location of the device in the optical transmission network 2 can be determined using the IP address. Thus, it is possible to determine whether the backup device has failed in the search operator extraction unit 30.

According to the modification example, it is possible to change the content of the unified alarm information even when the individual alarms are the same.

In the optical transmission network 2 of the first embodiment described above, it is conceivable that a large number of ripple alarms are issued due to the individual alarms transferred between the devices A, B, and C. Next, a monitoring device 12 according to a second embodiment for suppressing issuance of the ripple alarms will be described.

Second Embodiment

Figure 9:
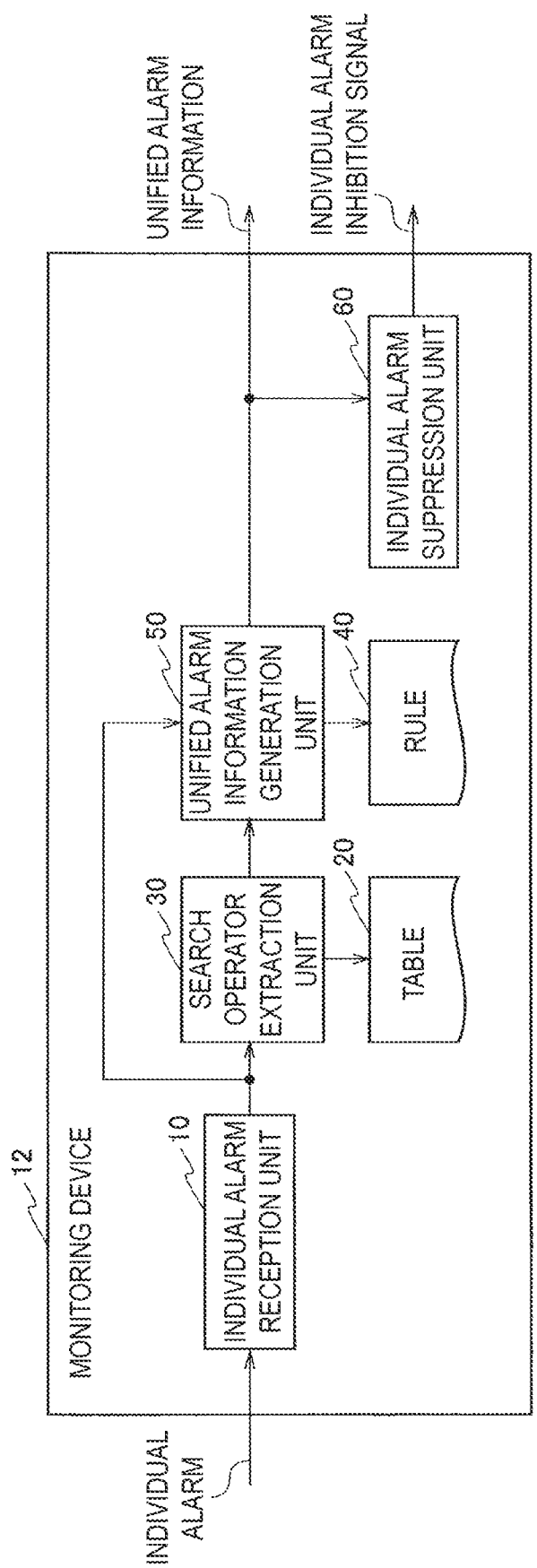
FIG. 9 is a block diagram illustrating a functional configuration of a monitoring device according to a second embodiment of the present invention.

FIG. 9 is a block diagram illustrating a functional configuration of a monitoring device according to a second embodiment of the present invention. The monitoring device 12 illustrated in FIG. 9 is different from a monitoring device 1 (FIG. 2) in that the monitoring device 12 includes an individual alarm suppression unit 60.

When a predetermined unified alarm information is issued, the individual alarm suppression unit 60 transmits an individual alarm inhibition signal for inhibiting issuance of subsequent individual alarms to each of a plurality of devices A, B, and C constituting an optical transmission network 2. The individual alarm inhibition signal is a signal for inhibiting issuance of all individual alarms after the predetermined unified alarm information is issued. Alternatively, the individual alarm inhibition signal may be a signal for inhibiting issuance of individual alarms for failure information transferred from the device after the predetermined unified alarm information is issued.

With the monitoring device 12 according to the embodiment, it is possible to suppress ripple alarms.

As described above, with the monitoring device 1 and a monitoring method according to the embodiment, it is possible to correctly identify issued alarms in the optical transmission network 2 configured by connecting optical transmission devices manufactured by different vendors. Further, with the monitoring device 12 according to the embodiment, it is possible to suppress the ripple alarms that occur in the optical transmission network 2.

Further, because the monitoring device autonomously generates the unified alarm information using a table 20 and a rules 40, it is possible to significantly reduce processing in an integrated monitoring unit 3. Further, even when the devices are of the same type and have different IPs, it is possible to treat the alarms in the same manner simply by associating device names of the devices with a search operator in the table 20.

In the embodiment described above, an example in which the table 20 and the rule 40 are included has been described, but the table 20 and the rule 40 may be configured integrally. That is, the table 20 illustrated in FIG. 5 and the rule 40 illustrated in FIG. 6 may be integrated by means of the search operator to configure a database. Thus, the present invention is not limited to the above described embodiment, and modifications can be made within the scope of the gist of the present invention.

REFERENCE SIGNS LIST 1, 12: Monitoring Device
2: Optical transmission network
3: Integrated monitoring unit
10: Individual alarm reception unit
20: Table
30: Search operator extraction unit
40: Rule
50: Unified alarm information generation unit
60: Individual alarm suppression unit
A, B, C: Device (element)

The invention claimed is:

1. A monitoring device comprising:
an individual alarm reception unit, including one or more processors, configured to receive individual alarms issued from a plurality of devices constituting an optical transmission network;
a table in which a search operator for searching for necessary information required for treating the individual alarms in a same manner when specifications of the individual alarms are different from each other, is associated with information included in the individual alarms;
a search operator extraction unit, including one or more processors, configured to extract the search operator using the information included in each of the individual alarms as a key;
a rule in which the search operator is associated with the necessary information; and
a unified alarm information generation unit, including one or more processors, configured to search the rule using the search operator as a key, compare the information included in the individual alarms with the necessary information described in the searched rule, and add information, that is included in the necessary information but not included in the individual alarms, to the individual alarms to generate unified alarm information.

2. The monitoring device according to claim 1, wherein the table includes a condition for extracting the search operator, and
the search operator extraction unit extracts the search operator when a condition included in the individual alarms matches the condition included in the table.

3. The monitoring device according to claim 1, further comprising:
an individual alarm suppression unit, including one or more processors, configured to transmit, when predetermined unified alarm information is issued, an individual alarm inhibition signal for inhibiting issuance of subsequent individual alarms to the plurality of devices constituting the optical transmission network.

4. A monitoring method executed by a monitoring device for monitoring an optical transmission network, the monitoring method comprising:
receiving individual alarms issued from a plurality of devices constituting the optical transmission network;
searching, using information included in each of the individual alarms as a key, a table in which a search operator for searching for necessary information required for treating the individual alarms in a same manner when specifications of the individual alarms are different from each other, is associated with the information included in the individual alarms, thereby extracting the search operator;
searching, using the search operator as a key, a rule in which the search operator is associated with the necessary information; and
comparing the information included in the individual alarms with the necessary information described in the searched rule, and adding information, that is included in the necessary information but not included in the individual alarms, to the individual alarms to generate unified alarm information.

5. The monitoring method according to claim 4, wherein the table includes a condition for extracting the search operator, and
wherein extracting the search operator comprises extracting the search operator when a condition included in the individual alarms matches the condition included in the table.

6. The monitoring method according to claim 4, further comprising:
when predetermined unified alarm information is issued, transmitting an individual alarm inhibition signal for inhibiting issuance of subsequent individual alarms to the plurality of devices constituting the optical transmission network.

* * * * *